United States Patent
Winn et al.

(10) Patent No.: US 9,184,578 B2
(45) Date of Patent: Nov. 10, 2015

(54) ACCESSORY SECTION FOR A CABLE TRAY SYSTEM

(71) Applicants: Richard Gregg Winn, Belleville, IL (US); Terry A. McCrary, Pinckneyville, IL (US)

(72) Inventors: Richard Gregg Winn, Belleville, IL (US); Terry A. McCrary, Pinckneyville, IL (US)

(73) Assignee: WBT, LLC, Belleville, IL (US)

( * ) Notice: Subject to any disclaimer, the term of this patent is extended or adjusted under 35 U.S.C. 154(b) by 194 days.

(21) Appl. No.: 14/026,653

(22) Filed: Sep. 13, 2013

(65) Prior Publication Data
US 2015/0076291 A1 Mar. 19, 2015

(51) Int. Cl.
*H02G 3/06* (2006.01)
*H02G 3/04* (2006.01)

(52) U.S. Cl.
CPC ........... *H02G 3/0608* (2013.01); *H02G 3/0443* (2013.01)

(58) Field of Classification Search
CPC . H02G 3/0608; H02G 3/0443; H02G 3/0456; H02G 3/0487

USPC .................... 248/49; 52/220.7; 3/49
See application file for complete search history.

(56) References Cited

U.S. PATENT DOCUMENTS

| | | | |
|---|---|---|---|
| 5,469,893 A | 11/1995 | Caveney | |
| 6,037,543 A * | 3/2000 | Nicoli et al. | 174/72 R |
| 6,547,192 B2 | 4/2003 | Rinderer | |
| 7,462,785 B1 * | 12/2008 | Davis et al. | 174/481 |
| 7,468,491 B2 * | 12/2008 | Deciry et al. | 174/480 |

FOREIGN PATENT DOCUMENTS

| | | |
|---|---|---|
| EP | 315023 | 10/1988 |
| EP | 2136447 | 12/2009 |
| GB | 2267605 | * 12/1993 |

* cited by examiner

*Primary Examiner* — Jeanette E Chapman
*Assistant Examiner* — Daniel Kenny
(74) *Attorney, Agent, or Firm* — Ryan N. Carter

(57) ABSTRACT

A cable tray accessory section adapted to combine two or more sections of a cable tray system. The cable tray accessory section includes a base and side walls adapted to removably combine with each other via a locking tab connection means. The ends of the accessory section combine with the cable tray sections by weaving flexible members between cross members of the tray sections.

18 Claims, 8 Drawing Sheets

ACCESSORY SECTION FOR A CABLE TRAY SYSTEM

BACKGROUND

This invention relates generally to cable tray systems used to support electrical wiring, cables, conduit and data transmission lines (collectively "cables"), and more particularly to junctions which connect two or more cable tray components.

Cable trays systems generally provide support for cables as the cables extend from a first location to a second location. Cable tray systems can be comprised of metal, plastic, or other suitable types of materials. One exemplary type of cable tray is referred to as a "mesh" or "basket" cable tray. These types of cable trays are comprised of interconnected metal bars or wires. Most mesh cable trays include space apart U-shaped cross members which are connected by lateral support members. The cables are generally supported by the bottom portion of the cross members as the cable tray system carries the cable from one point to another point.

Most cable trays are adapted to join with one or more other cable trays at intersections such as T-intersections or four-way intersections to create the cable tray system. Further, sometimes a radius or bend section is necessary to allow a single cable tray to turn a corner. Other accessories used to connect portions of a cable tray system include reduces, benders, risers, and cross pieces. Collectively, these various accessories are sometimes referred to herein as "accessory sections."

Most mesh or basket cable trays are designed to be field configured out of straight sections, meaning no accessory sections exist. For the few that do, they are bulky and expensive to ship in that they are created as a single section at the factory, and difficult to assemble/install. There is therefore a need for an improved accessory section which overcomes these and other deficiencies in the prior art.

SUMMARY

The present invention comprises improvements to cable tray accessory sections used in cable tray systems. In this embodiment the base of the accessory section includes an end portion which extends toward and weaves between the cross members of the adjoining cable tray section. The side walls may similarly combine with the adjoining tray section.

In another embodiment the cable tray accessory section comprises a generally flat base and one or more generally vertical side walls. One of the base and side walls have tab members which are received by openings in the other of the base and side walls. The base and the side walls can be assembled onsite thereby allowing them to be shipped/transported in their flat and unassembled configuration.

In yet another embodiment the accessory sections include one or more openings adapted to receive a support member. The support member helps to support the accessory section independent from any support provided by adjoining tray sections.

DETAILED DESCRIPTION

Figure 1:
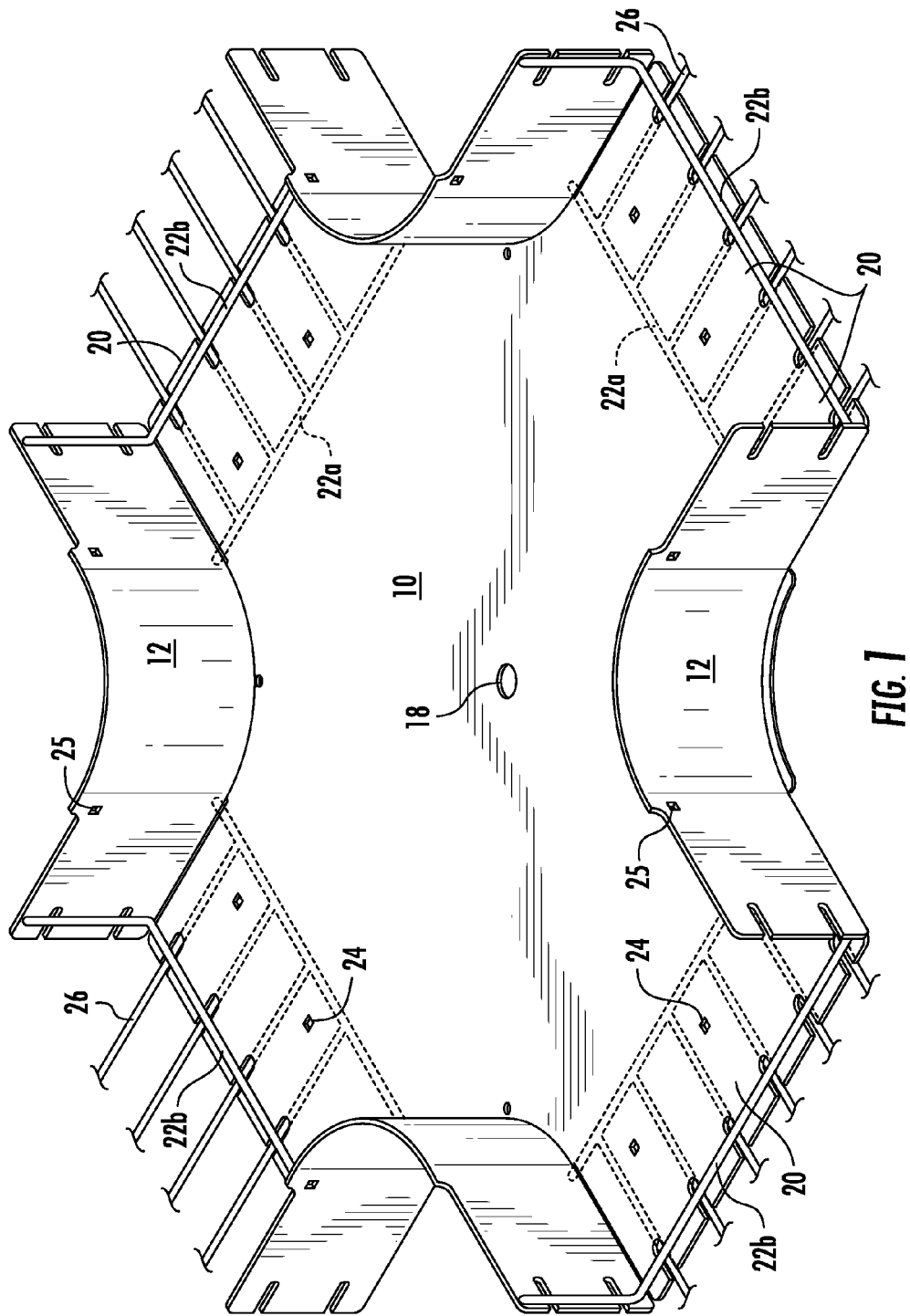
FIG. 1 is a perspective view of an accessory section having a four-way intersection.
Figure 2:
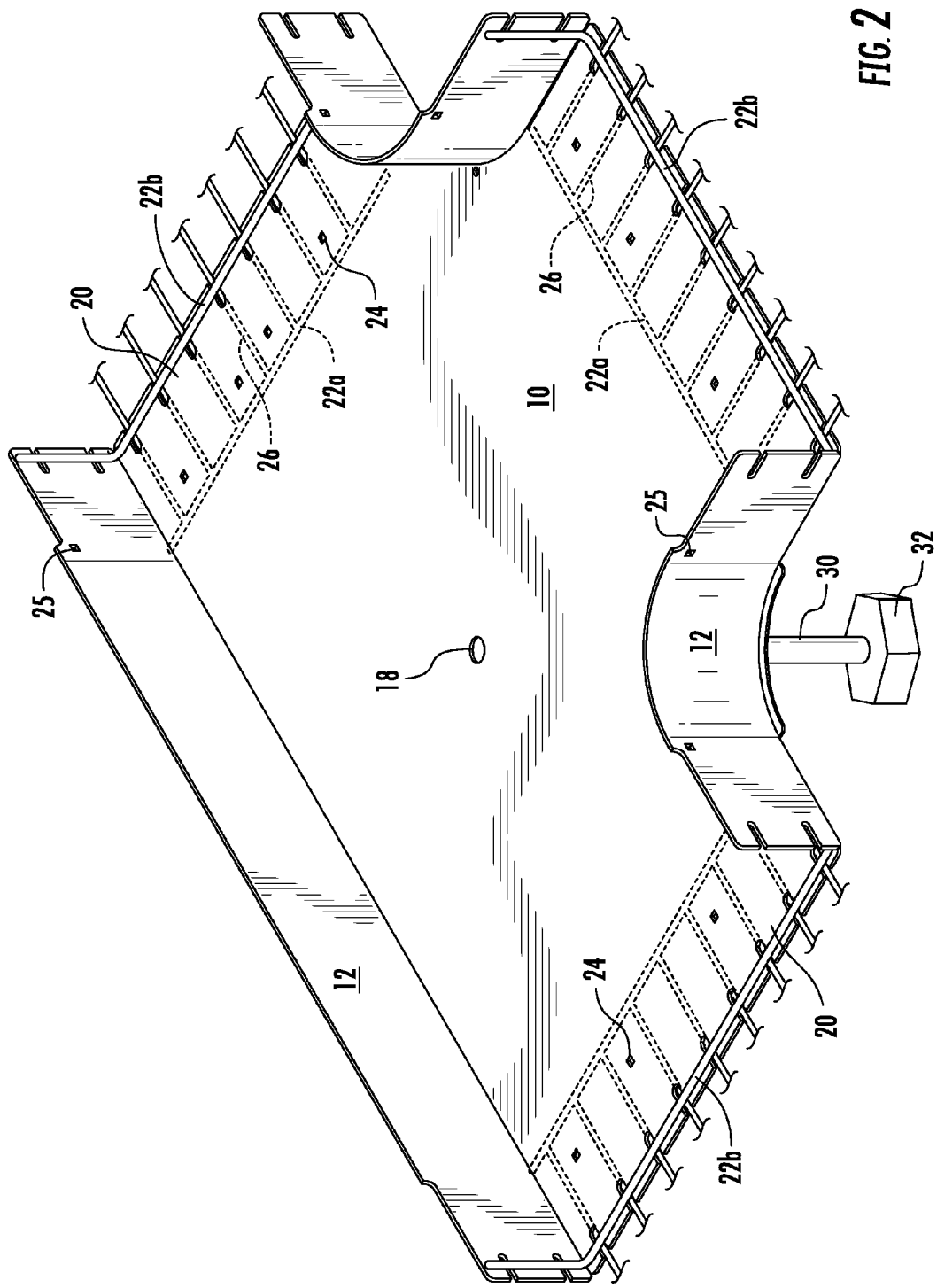
FIG. 2 is a perspective view of an accessory section having a three-way intersection.
Figure 3:
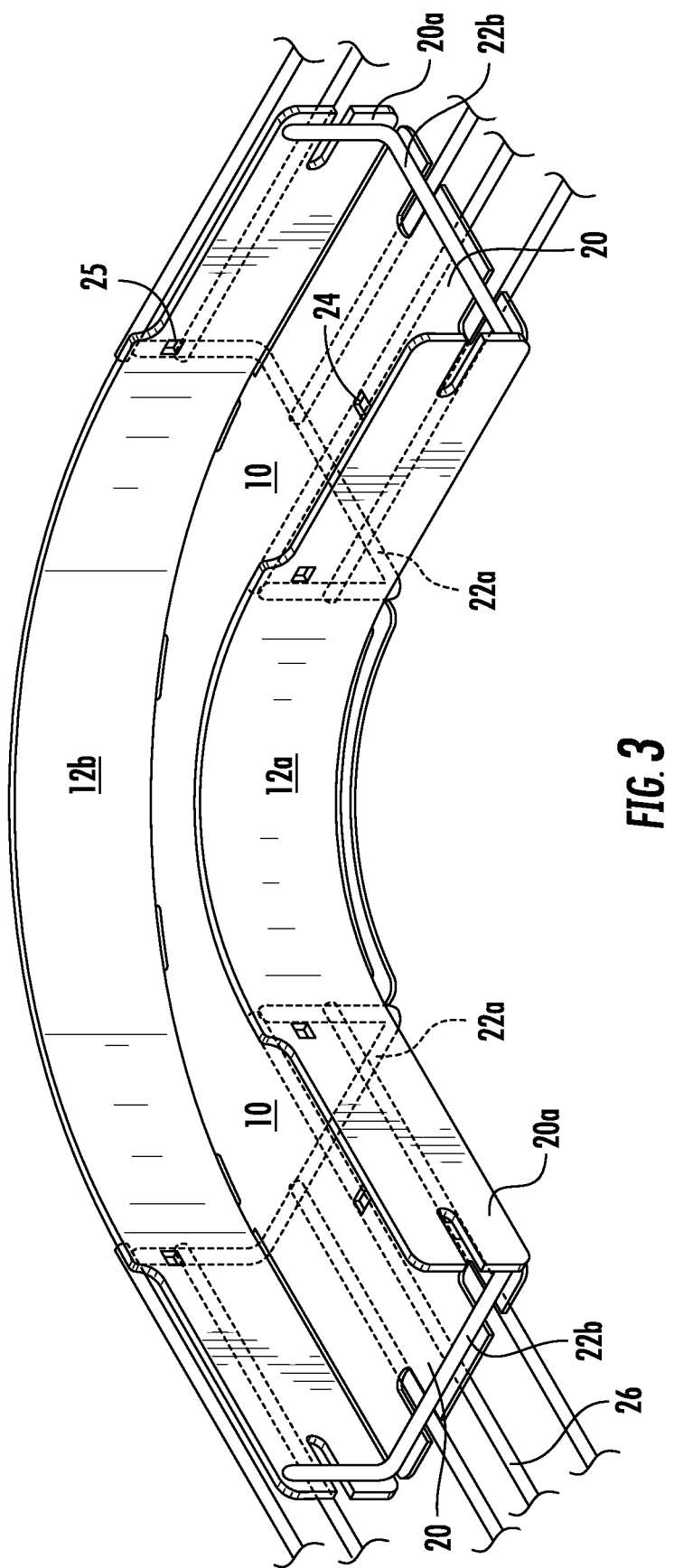
FIG. 3 is a perspective view of an accessory section that is a radius bend.

As shown generally in FIGS. 1-3, the present invention comprises a cable tray accessory section for combining one or more cable tray sections of a cable tray system. As shown, the cable tray accessory section generally comprises a base 10 combined with one or more sidewalls 12. Together the base 10 and sidewalls 12 support and guide cables to and from their intended locations by serving as intersections (FIGS. 1 and 2), radius bends (FIG. 3), and other suitable accessory sections. In some embodiments the base 10 portion may comprise a rib member or other suitable support combined therewith or fabricated therein to help strengthen the base 10 and keep it rigid. This is important in embodiments where the base 10 is large and/or in embodiments where the base 10 is used to support an excessive amount of cable weight.

In the embodiments shown, the cable tray sections are wire mesh cable trays comprising longitudinal members 26 and cross members 22a, 22b, however, any other suitable cable tray may be used. Preferably, the cable tray sections of the cable tray system comprise a plurality of cross members 22a, 22b at regular intervals. In most embodiments, the cross members 22a, 22b are generally perpendicular to the longitudinal axis of the cable tray.

Figure 4:
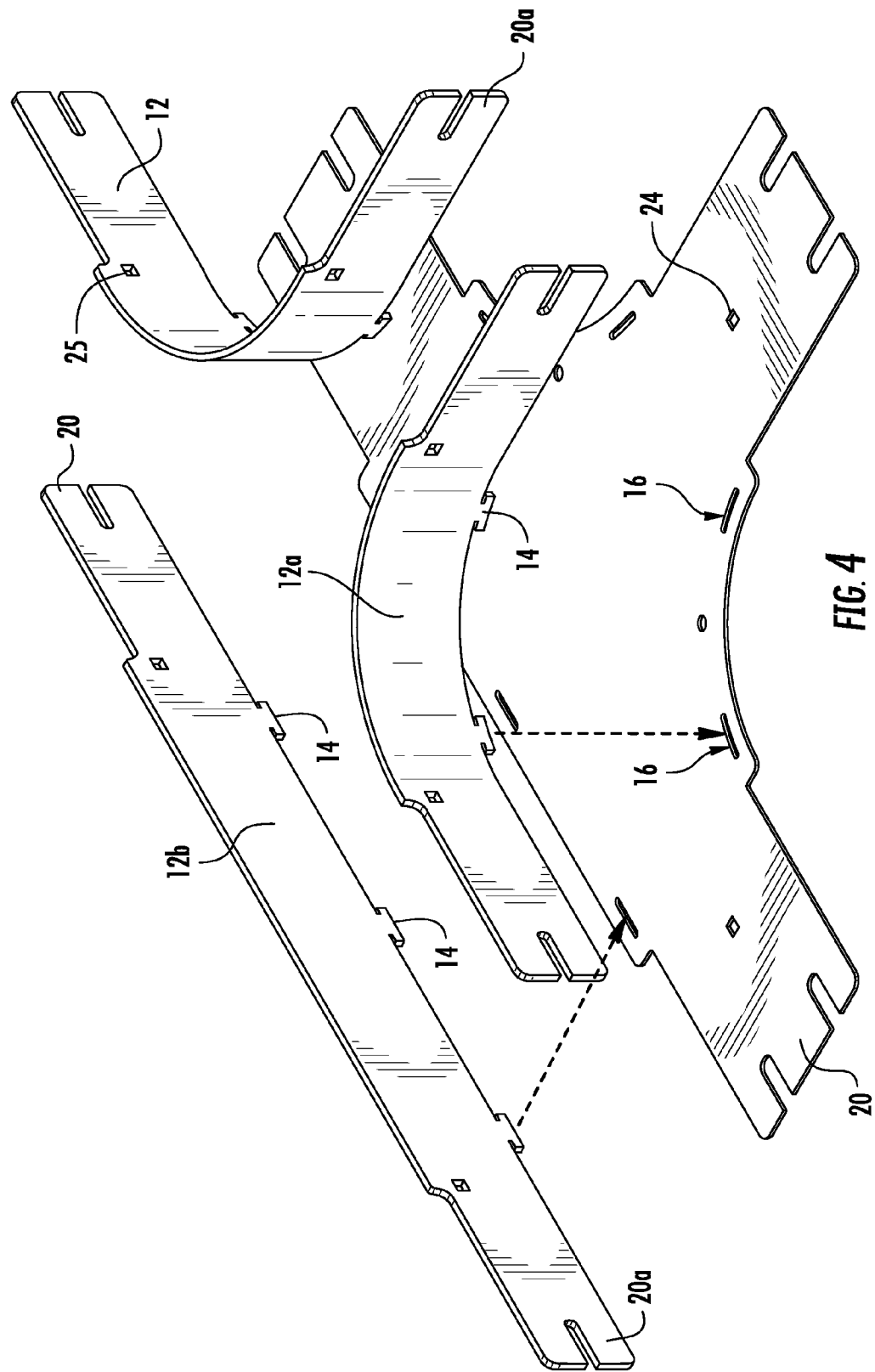
FIG. 4 is an exploded view of an accessory section showing an embodiment wherein the base member combines with the side walls via locking tabs.

Some embodiments include a means for connecting the accessory sections to the cable tray sections. FIGS. 1-5 show an embodiment wherein the accessory section combines with the cable tray sections by weaving ends (or tabs 20) of the accessory section between cross members 22a, 22b of the cable tray. As shown in the figures, the accessory sections comprise at least two ends adapted to combine with a cable tray. The ends may be on the base 10 or the sidewalls 12 and the ends extend toward the cable tray (i.e. away from the center of the base 10). Each end has a top side, a bottom side, and at least one tab member 20. The tab member 20 is the outermost portion of the end and it may be flexible in some embodiments as described below. Some accessory sections have a single tab member 20 extending from one or more of its ends while others have multiple tab members 20 extending from one or more of its ends. FIG. 1 shows an accessory section wherein the base portion 10 has seven tab members 20 extending from each of its four ends. FIG. 2 shows an accessory section wherein the base portion 10 has ten tab members 20 extending from each of its three ends. FIG. 4 shows an accessory section wherein the base portion 10 has three tab members 20 extending from each of its three ends.

To combine the accessory section with the cable tray, the accessory section ends are woven or interlocked with a portion of the cable tray. As discussed above, the cable tray preferably comprises at least a first cross member 22a spaced apart and generally parallel with a second cross member 22b. As used herein, the first cross member 22a is the one which is located farthest from the end (closest to the center of the base 10) and the second cross member 22b is located closer to the end (farther from the center of the base 10). In some embodiments, the bottom of the base member 10 end is adapted to be placed over the first cross member 22a and the top side of the base member 10 end is adapted to be placed under the second cross member 22b. In other embodiments, the top of the base member 10 end is adapted to be placed under the first cross member 22a and the bottom side of the base member 10 end is adapted to be placed over the second cross member 22b. The former configuration (where the bottom of the base member 10 end is adapted to be placed over the first cross member 22a and the top side of the base member 10 end is adapted to be placed under the second cross member 22b) is preferable since it allows for a smooth transition from the cable tray to the accessory section without the edge of the accessory section protruding above the cable tray which might damage the cables. In some embodiments it is the tab member 20 which contacts the second cross member 22b since the tab member 20 is the outermost portion of the end.

In some embodiments each tab member 20 is adapted to bend from a first position to a second position relative to its adjacent tab member 20 (if any) and relative to the base 10 of the accessory section. The tab members 20 are biased in their first position. The first cross member 22a creates a support or fulcrum which helps to bias the tab member 20 in its first position as the end of the base member 10 end extends over (or under) it. The tab members 20 are bent to their second position then inserted under (or over) one of the second cross members 22b of the cable tray to create a friction fit which helps secure the accessory section to the cable tray. The friction is caused by the tab members 20 pushing against the second cross members 22b as the tab members 20 try to return to their first position.

In the embodiment shown, there is an opening or space on each side of the tab members 20. This opening allows the accessory sections to be combined with different sizes and styles of tray sections. For example, some types of tray sections may have their cross members 22a, 22b spaced differently along the length of the cable tray. The opening between tab members 20 allow the cross members 22a, 22b to have different spacing while still allowing a portion of the tab members 20 to fit underneath (or over) the second cross member 22b. The tab members 20 are bent at a sharper angle (relative to their first position) to accommodate cross members 22a, 22b that are closer together and a shallower angle for cross members 22a, 22b that are farther apart. The openings may also align with the longitudinal members 26 of the cable tray to help hold the accessory section in place relative to the cable tray.

Figure 5:
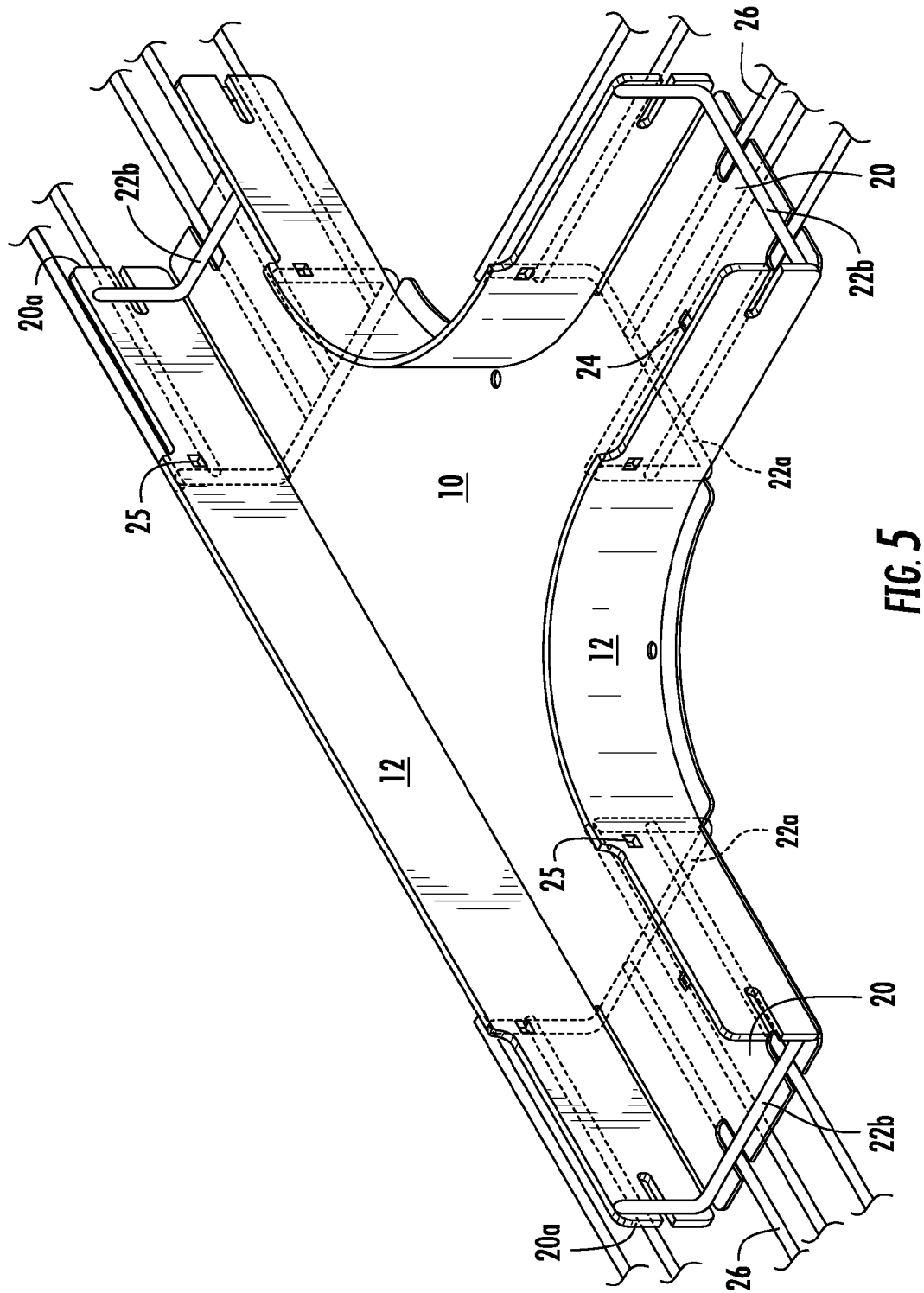
FIG. 5 is a perspective view of another embodiment of an accessory section having a three-way intersection.

As shown best in FIGS. 3 and 5, the side walls 12 of the accessory section also comprise ends having a top side, a bottom side and at least one tab member 20. The side walls 12 are adapted to combine with the cable tray in the same manner as described above for the base section 10.

Figure 6:
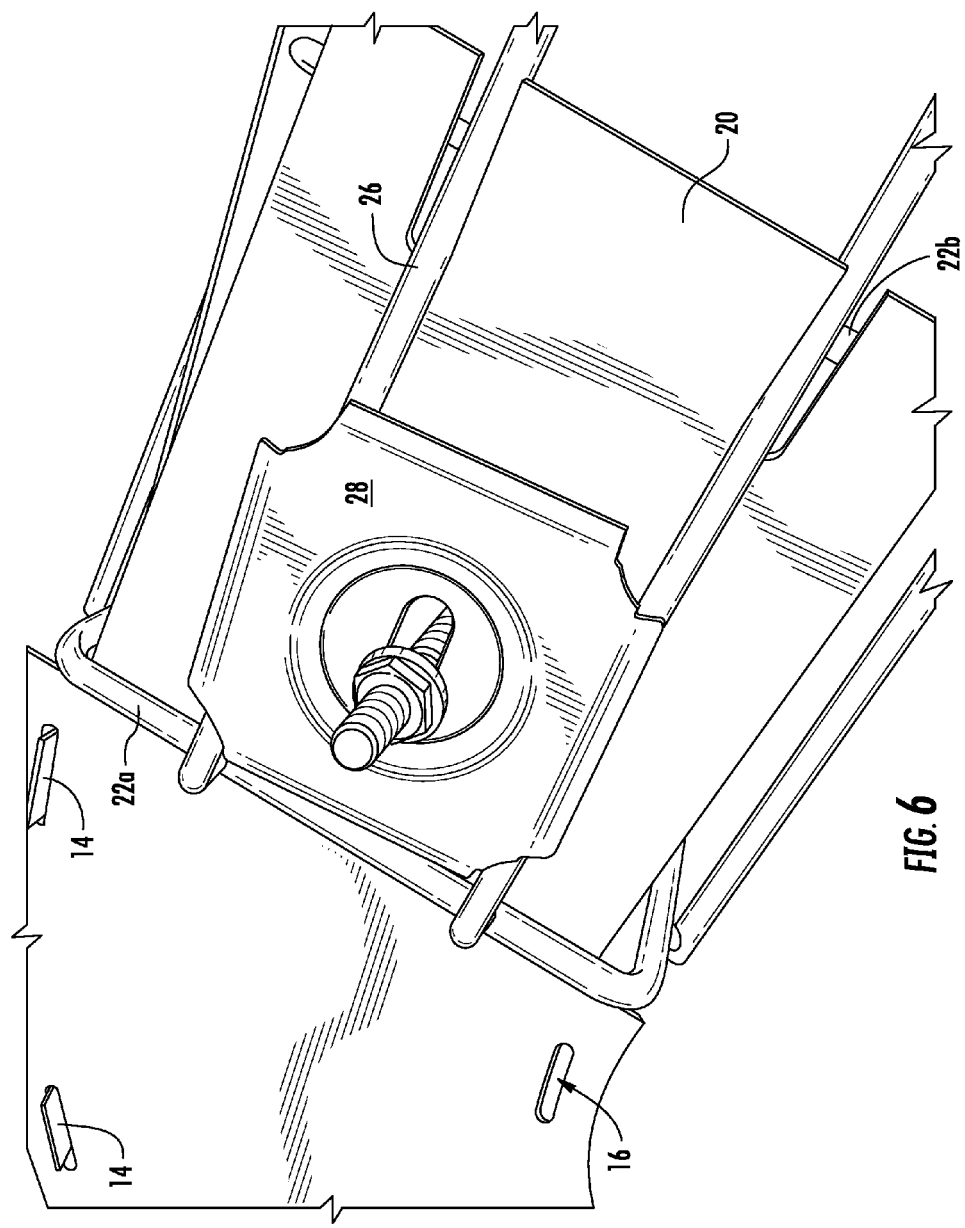
FIG. 6 is a bottom perspective view showing an embodiment having a mechanical fastener to help secure the accessory section to the cable tray.

As described above, the tab members 20 are the primary means for securing the accessory section to the tray assembly. However, some situations require additional fastening means to secure the two components. FIG. 6 shows an embodiment wherein an additional fastener 28 is used to help secure the accessory section to the cable tray. FIG. 6 shows the underside of an exemplary accessory section. In the embodiment shown, the fastener 28 comprises a backing plate adapted to secure against one or more of the cable tray sections 22, 26. The fastener 28 further comprises a bolt extending through an opening 24 in the accessory section and the backing plate. The bolt and backing plate mechanically secures the accessory section to the cable tray. FIGS. 3 and 5 show openings 25 in the side walls 12 of the accessory sections. These openings 25 are adapted to receive mechanical fasteners similar to fastener 28 to help secure the side walls 12 to the cable tray.

FIG. 4 shows an embodiment wherein the base section 10 and the side walls 12 are removably combined with each other using a locking tab connection means. In this embodiment one of the base 10 and side walls 12 comprise tab members 14 which are received by openings 16 in the other of the base 10 and side walls 12 thereby allowing the components to be easily assembled and disassembled. The embodiment shown in the figures has the tab members 14 combined with the side walls 12 and openings 16 in the base member 10, however, the components may be reversed. The base 10 and side walls 12 are each generally flat components. The side walls 12 can easily be bent around curved edges of the base 10 as shown by wall 12a in FIG. 4. One benefit of this embodiment is that the base 10 and the side walls 12 can be assembled on site thereby allowing them to be shipped/transported in their flat and unassembled configuration.

The tab members 14 are preferably shaped and sized to create a snap or friction fit in openings 16 thereby making them difficult to remove. In some embodiments the tab members 14 may be twisted or bent after insertion into the openings 16 thereby helping to lock the components in their assembled configuration.

Some components of the invention are interchangeable thereby increasing the ease of use and assembly. While each base section 10 is unique, some of the side walls 12 are interchangeable. For example, sidewall 12a in the radius bend embodiment (FIG. 3) is interchangeable with sidewall 12a in the three way intersection shown in FIG. 4. Similarly, sidewall 12b in the radius bend embodiment (FIG. 3) is interchangeable with sidewall 12b in the three way intersection shown in FIG. 4.

FIGS. 1, 2, 7, and 8 shown an embodiment wherein the base 10 comprises an opening 18 adapted to receive a support post 30. In most prior art devices the accessory section is supported by the cable tray to which it combines and does not have its own support member. The National Electrical Code (NEC) recommends that supports be installed along the cable tray within one foot of any accessory section. In a four-way intersection, this would require four tray supports within the area of the cross.

Figure 7:
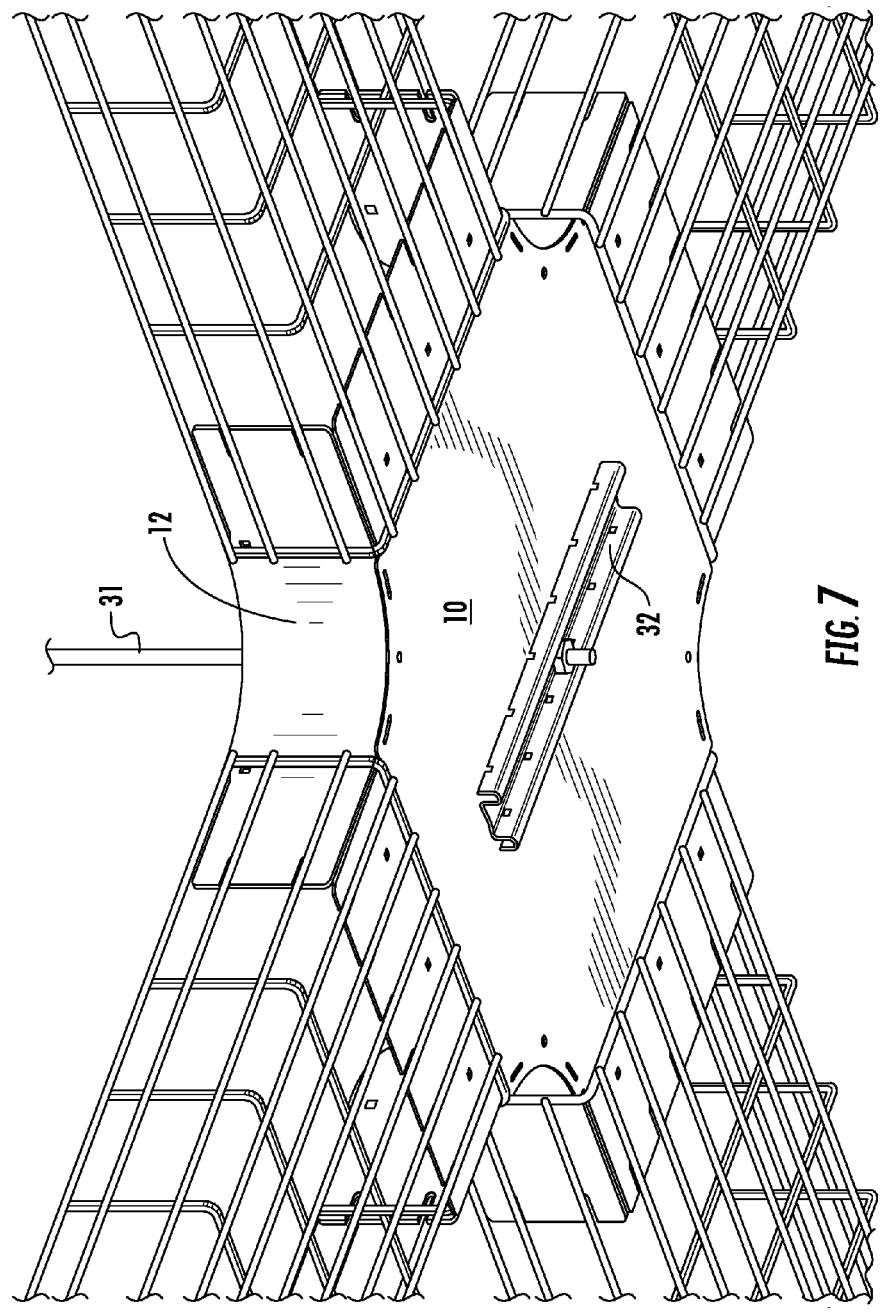
FIG. 7 is a perspective view of the underside of an accessory section showing a support member supporting an accessory section from the top.
Figure 8:
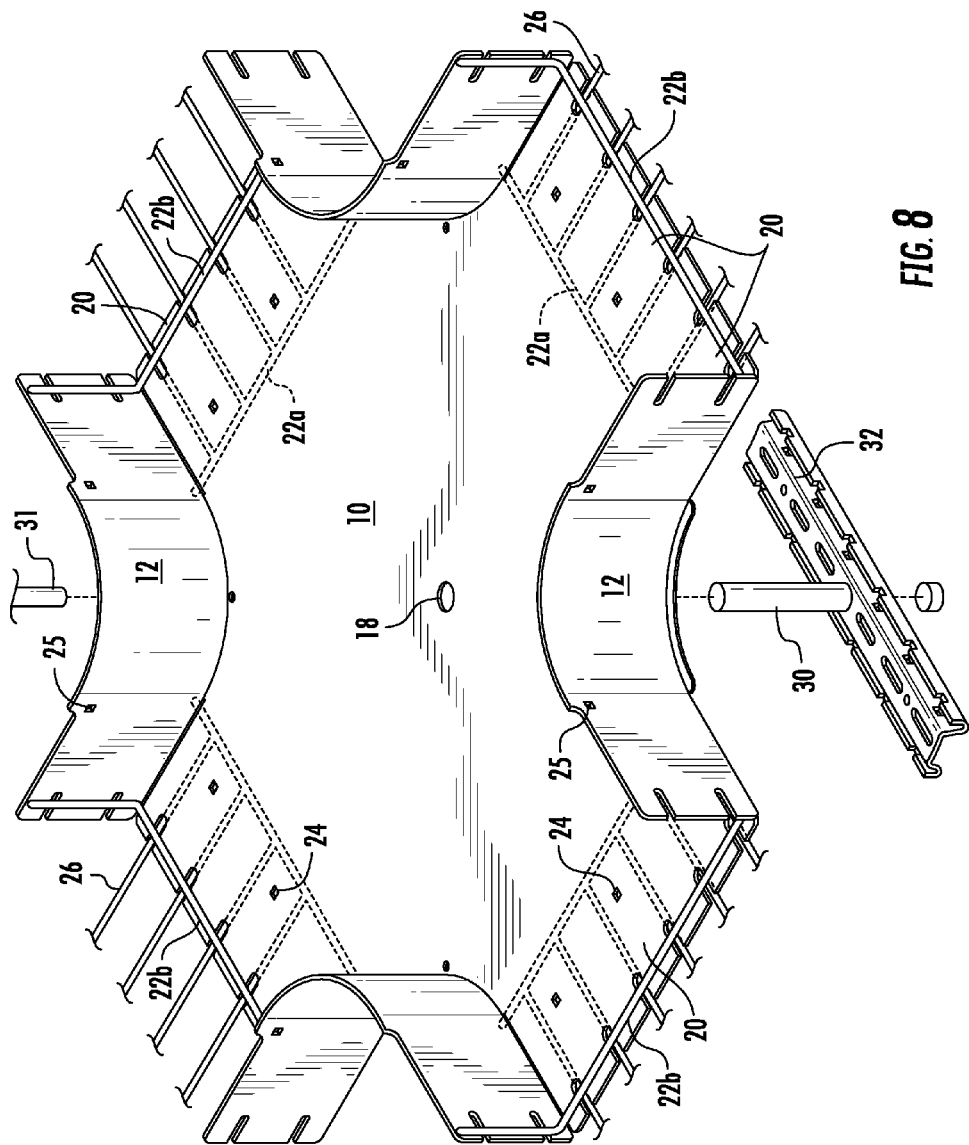
FIG. 8 is an exploded view of the accessory section support shown in FIG. 7.

This embodiment of the invention, however, allows for supports to be combined directly with the accessory section. Opening 18 is adapted to combine with the support post 30 to support the accessory section from below as shown in FIG. 2. In this embodiment one portion of the support post 30 is combined with the accessory section and the other end contacts the ground or other stable structure 32 located below the accessory section. The support post 30 thereby holds the accessory section at a predetermined height. The support post 30 supports the accessory section independent from any support provided by the adjoining cable tray. FIGS. 7 and 8 show an alternate embodiment wherein the support post 30, 31 is combined with the ceiling or other stable structure above the accessory section to provide support.

As shown in FIG. 2, the support may be a single post 30 adapted to be received by opening 18 to support the accessory section. In other embodiments the support means comprises multiple components as shown best in FIG. 8 wherein the support means comprises an outer post 30 having an opening adapted to receive an inner post 31. The posts 30, 31 are combined with a retainer member 32 which may contact the floor surface to hold the support means at a desire height as shown in FIG. 2 or the retainer member 32 may contact and support the bottom of the accessory section as shown in FIG.

7 for embodiments which support the accessory section from above. By having an accessory section with its own support, the four tray supports which would normally be installed (for a four way intersection) can be eliminated to reduce the material list by three supports.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. An accessory section for a cable tray system having a first cross member and a second cross member, said accessory section comprising:
   a base member having a plurality of openings therein and at least two ends, each said end adapted to combine with the cable try system;
   one or more sidewalls having a plurality of tab members combined therewith;
   wherein the openings in the base member are configured to receive the tab members to allow the accessory section to transform between an unassembled configuration wherein the base member and one or more side walls are not combined and an assembled configuration wherein the base member with the one or more sidewalls are combined;
   an opening in the base member adapted to receive a support member capable of supporting the accessory section at a predetermined height;
   wherein the support provided by the support member is independent from any support provided by the cable tray system;
   wherein each end has a top side, a bottom side, and at least one tab member, and one of the top side and the bottom side are adapted to face toward the first cross member and the other of the top side and bottom side are adapted to face toward the second cross member thereby weaving the base member end between the cable tray system cross members.

2. The accessory section of claim 1 wherein the base member comprises at least three ends adapted to combine with the cable tray system.

3. The accessory section of claim 1 wherein the base member comprises at least four ends adapted to combine with the cable tray system.

4. The accessory section of claim 1 wherein the support member supports the accessory section from below.

5. The accessory section of claim 1 wherein the support member supports the accessory section from above.

6. The accessory section of claim 1 wherein the support member includes an outer post received with an inner post and both posts are combined with a retainer member.

7. The accessory section of claim 1 wherein the components are reversed such that tab members are combined with the base member and the openings are in the one or more sidewalls.

8. The accessory section of claim 1 wherein the base member and one or more side walls have a generally flat profile in their unassembled configuration.

9. The accessory section of claim 8 wherein the base section includes one or more contours; and wherein the one or more sidewalls are bendable to conform to the contours of the base section.

10. The accessory section of claim 1 wherein the base member is a radius bend.

11. The accessory section of claim 1 wherein the tab member bends between a first position and a second position and is biased in its first position.

12. The accessory section of claim 11 wherein the tab member bends to its second position when its top side faces toward the first cross member and its bottom side faces toward the second cross member.

13. The accessory section of claim 11 wherein the tab member bends to its second position when its bottom side faces toward the first cross member and its top side faces toward the second cross member.

14. The accessory section of claim 1 wherein each tab member is separated by an opening.

15. The accessory section of claim 1 further comprising a base member combined with one or more sidewalls.

16. The accessory section of claim 15 wherein the ends extend from the base member.

17. The accessory section of claim 15 wherein the ends extend from the sidewalls.

18. The accessory section of claim 15 wherein the base member further comprises an opening adapted to receive a mechanical fastener for mechanically securing the base member to the cable tray.

* * * * *